UNITED STATES PATENT OFFICE.

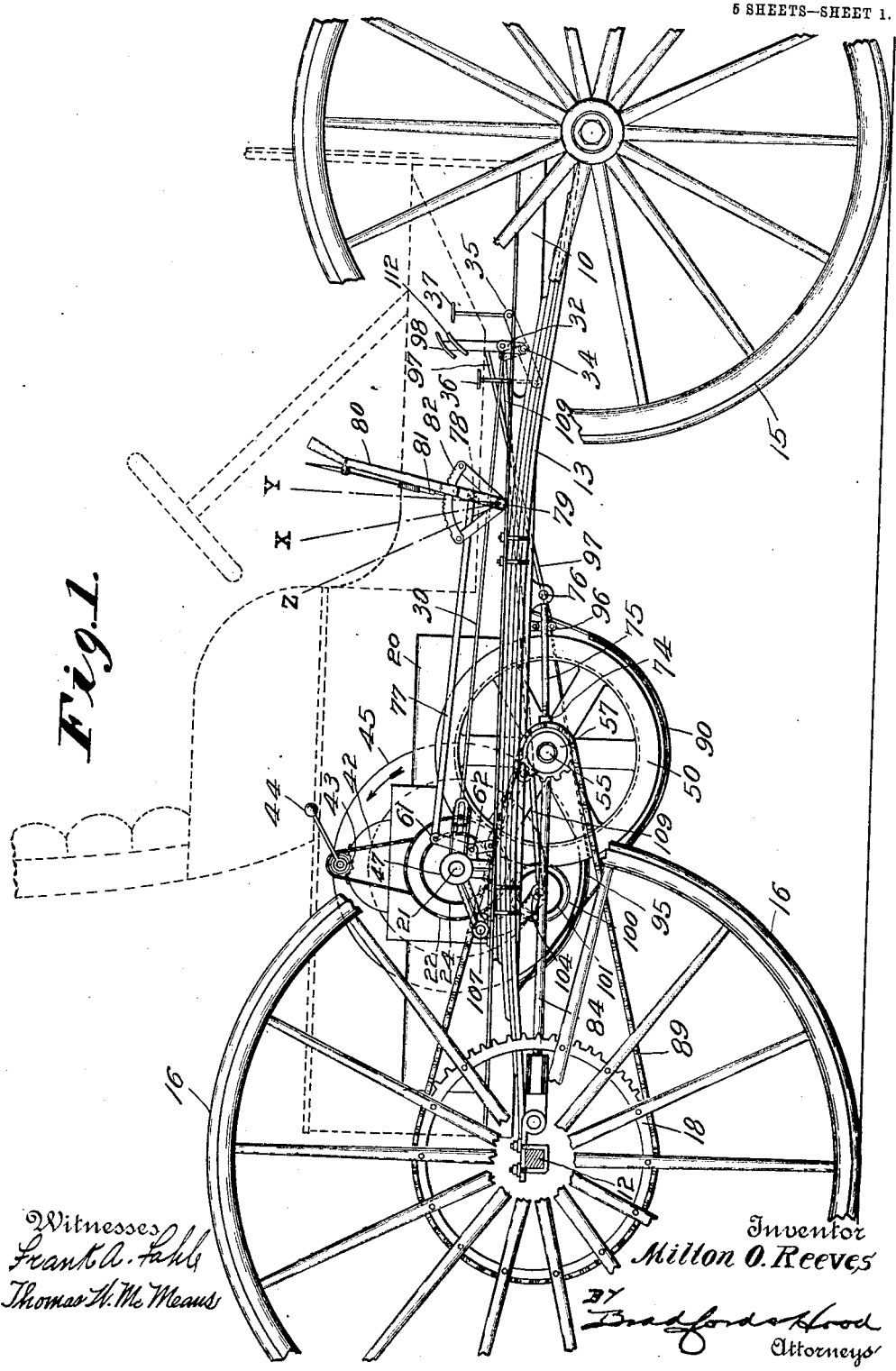

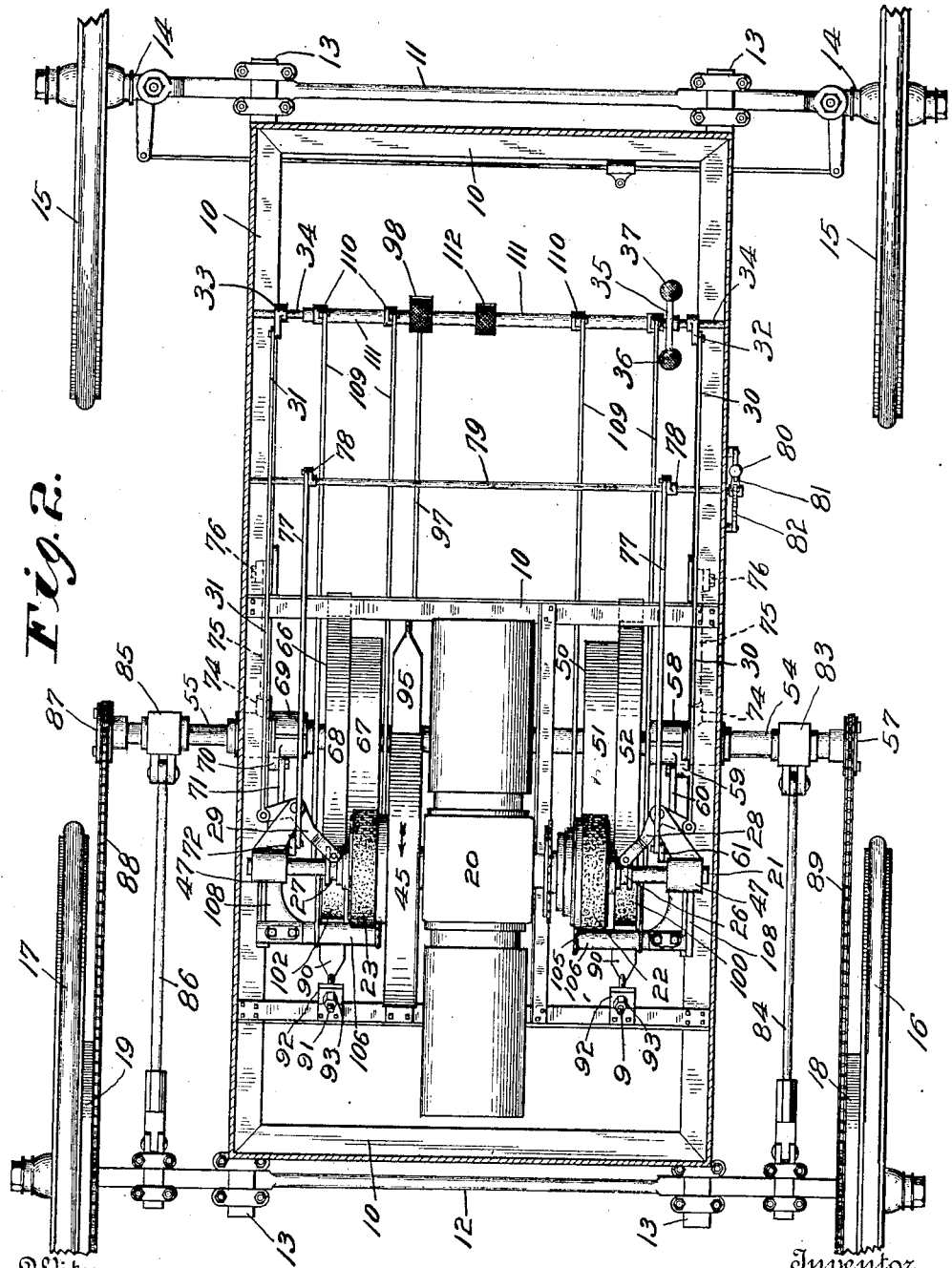

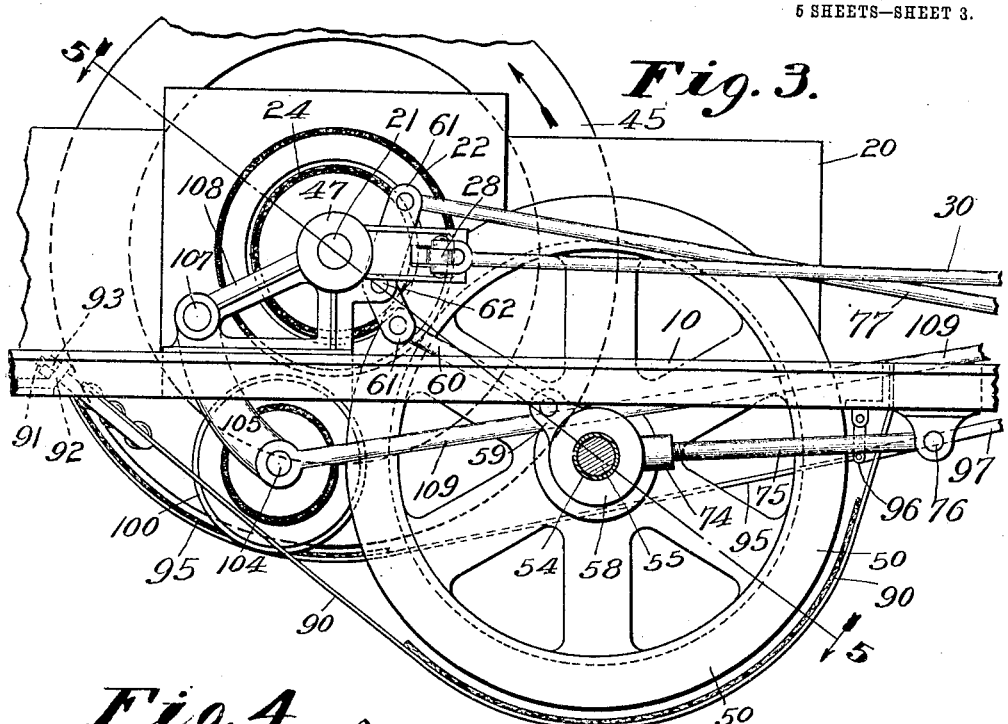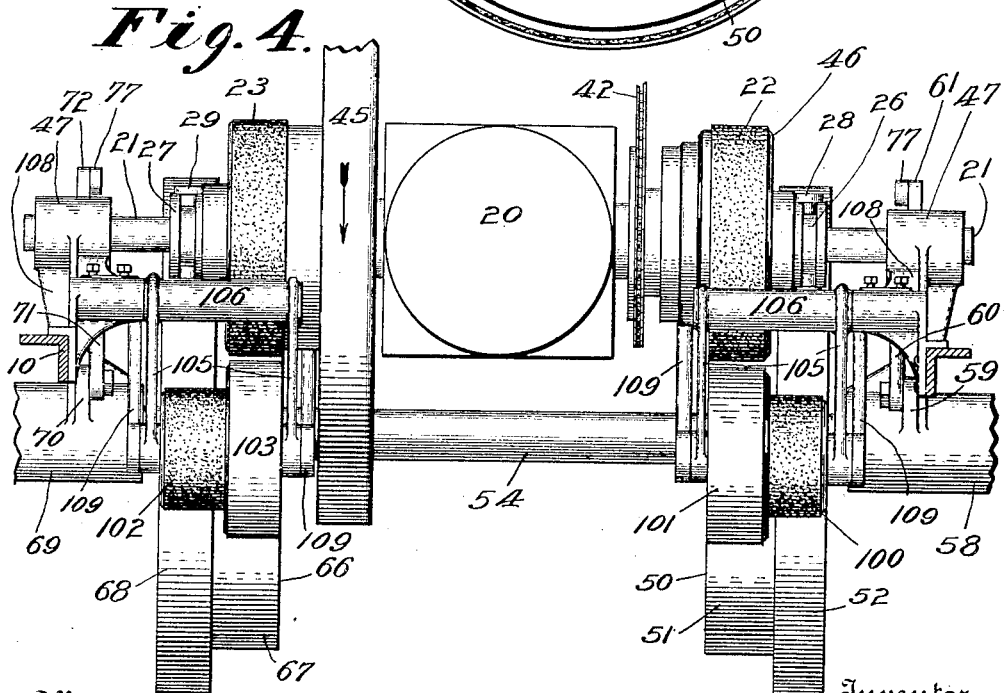

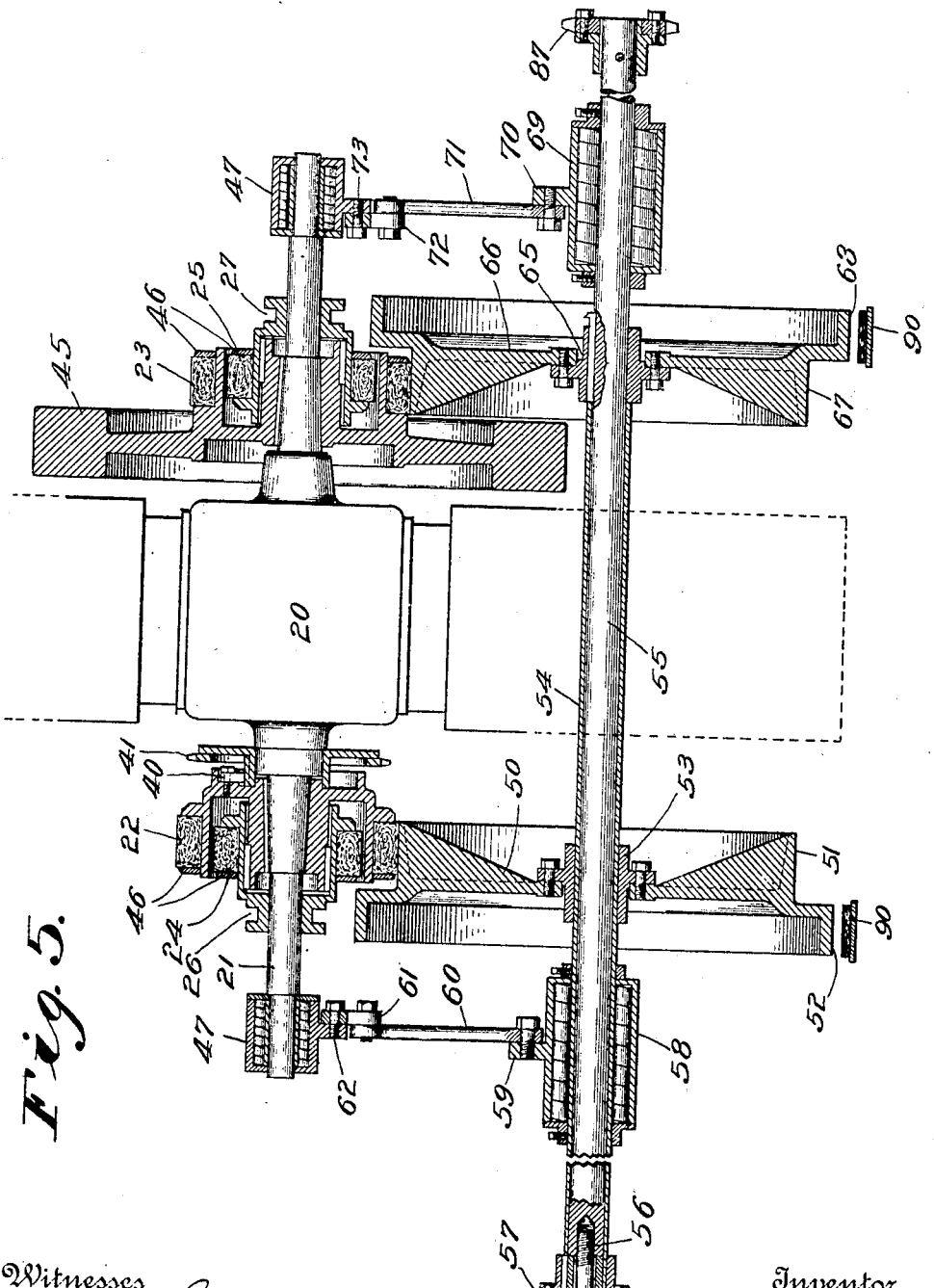

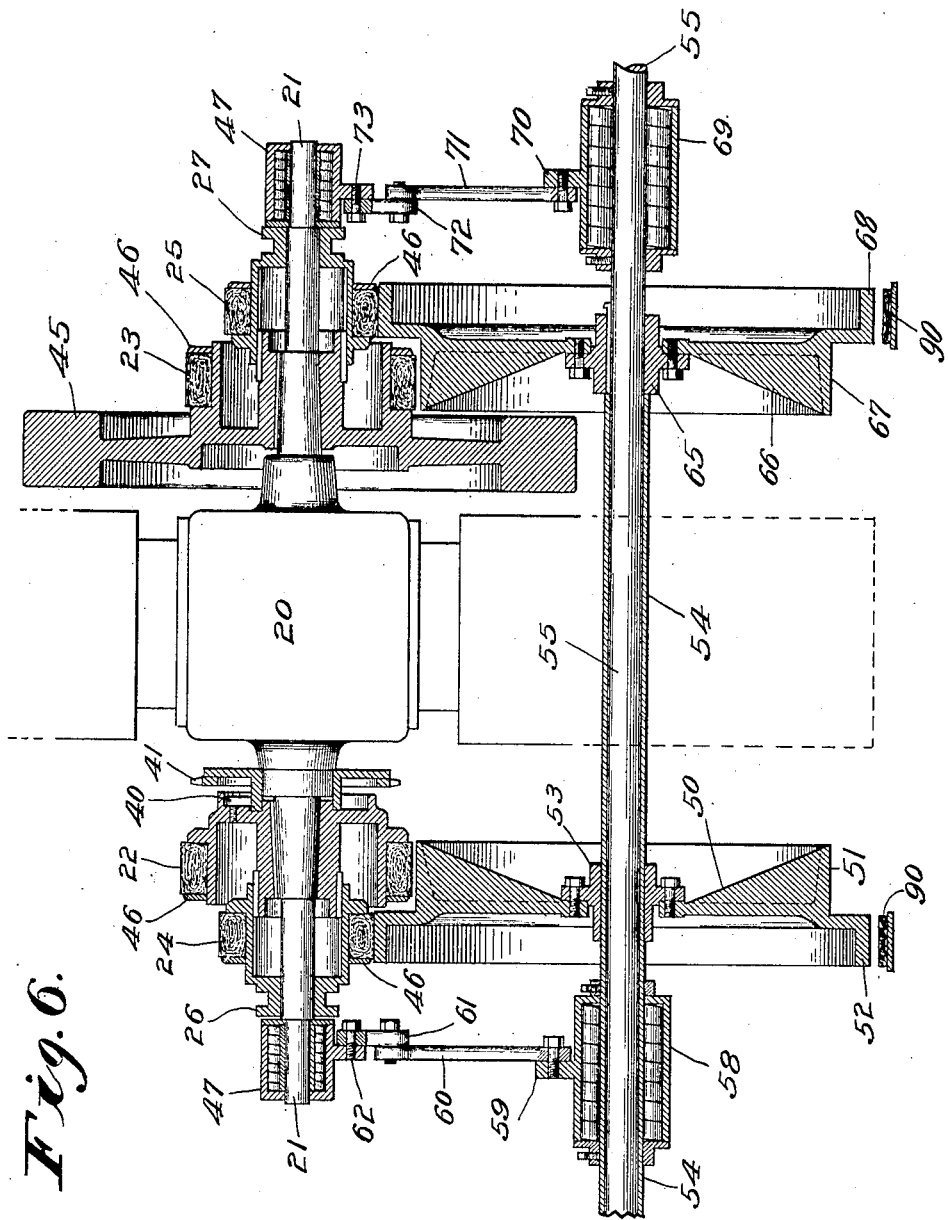

MILTON O. REEVES, OF COLUMBUS, INDIANA, ASSIGNOR TO REEVES PULLEY COMPANY, OF COLUMBUS, INDIANA, A CORPORATION OF INDIANA.

AUTOMOBILE TRANSMISSION MECHANISM.

No. 904,723.  Specification of Letters Patent.  Patented Nov. 24, 1908.

Application filed October 19, 1907. Serial No. 398,234.

*To all whom it may concern:*

Be it known that I, MILTON O. REEVES, a citizen of the United States, residing at Columbus, in the county of Bartholomew and State of Indiana, have invented certain new and useful Improvements in Automobile Transmission Mechanism, of which the following is a specification.

The object of my invention is to produce a simple yet efficient driving mechanism for the traction wheels of motor vehicles.

The accompanying drawings illustrate my invention.

Figure 1 is a side elevation of a chassis embodying my invention; Fig. 2 a plan thereof; Fig. 3 a side elevation on an enlarged scale of the engine shaft, jack shaft, the coöperating friction wheels carried thereby, the reversing friction wheel, brakes, and adjacent parts; Fig. 4 a rear elevation of the parts shown in Fig. 3; Fig. 5 a section on line 5—5 of Fig. 3 with the parts in the high speed position, and Fig. 6 a view similar to Fig. 5 with the parts in low speed position.

In the drawings 10 indicates a suitable supporting frame of any desired construction supported in any desired manner upon the front axle 11 and rear axle 12, such support, in the drawings, being shown as ordinary side bar springs 13 which are clipped on the rear axle so as to slide longitudinally. Pivotally mounted upon the front axle are the steering wheel spindles 14, 14 carrying the steering wheels 15, 15 in the usual well known manner.

Journaled upon the outer ends of the rear axle 12 are the traction wheels 16 and 17 provided with sprocket wheels 18 and 19 respectively.

The engine 20 is supported in any suitable manner upon frame 10 and its shaft 21 is projected beyond each side of the engine. Keyed to the opposite ends of shaft 21 are the friction wheels 22 and 23, which wheels are hollow and adapted to receive therein the smaller friction wheels 24 and 25 respectively, said wheels 24 and 25 being splined upon the hubs of their respective wheels 22 and 23 so that they may be shifted into or out of said wheels. As the wheels 22, 23, 24 and 25 are the smaller wheels of the driving trains, I prefer to make them of a material which will be properly frictionally coöperative with the larger metallic wheels to be described, and in practice I have found that these wheels may be satisfactorily made of paper in the manner of ordinary paper friction pulleys.

The wheels 24 and 25 are provided with shifting collars 26 and 27, respectively, adapted to be engaged by the shifting levers 28 and 29, respectively. These levers are connected by links 30 and 31 respectively with crank arms 32 and 33, respectively, carried by a rock shaft 34 journaled in the forward end of frame 10 and provided with a cross arm 35 to the opposite ends of which are connected the foot pedals 36 and 37, which operate upon the rock shaft in opposite directions.

Connected to the pulley 22 by a suitable ratchet connection 40 is a sprocket wheel 41 connected by a chain 42 with a sprocket wheel 43 provided with a crank arm 44 by means of which the engine may be "cranked". Wheel 23 may be conveniently formed integral with the fly wheel 45 and, for convenience in replacing the paper friction elements, each of these pulleys is built up in the usual well known manner of an annulus of hard paper stock held in place by a removable ring 46. Shaft 21 is preferably provided with out-board bearings 47, 47 mounted upon the frame 10.

Arranged to coöperate with pulleys 22 and 24 is a step pulley 50 having a high-speed-step 51 and a larger low-speed-step 52. This pulley may be conveniently formed of an aluminum casting bolted to a collar 53 secured, by brazing or otherwise, to a tubular shaft 54 sleeved upon the shaft 55, said shaft passing entirely through the tube 54 and normally held against withdrawal by means of a bolt 56, the head of which lies outside of a sprocket wheel 57 keyed to the outer end of tube 54. Tubular shaft 54 passes through a bearing box 58 provided with an ear 59 to which is pivotally connected one end of a link 60, the opposite end of said link being attached to one arm of a bell crank lever 61 pivoted at 62 to the bracket 108 of the adjacent out-board bearing 47.

Keyed upon shaft 55, and abutting against the inner end of tubular shaft 54, is a collar 904,723

65 like collar 53. Bolted to collar 65 is a stepped friction pulley 66, like pulley 50 and having a high-speed step 67 and a larger low-speed step 68, which is connected by suitable means with pulleys 23 and 25 respectively. Shaft 55 passes through a bearing block 69 like the bearing block 58 and said bearing block is provided with an ear 70 to which is pivoted one end of a link 71, the opposite end being pivoted to one arm of a bell crank lever 72 pivoted at 73 to the bracket 108 of the adjacent out-board bearing 47. The bearing blocks 58 and 69 are each provided with a stud or boss 74 to which is secured one end of a distance rod 75 pivoted at its forward end 76 to frame 10.

Extending from the upwardly extending arms of the two bell crank levers 30 and 72, which are alike, are links 77, 77, the forward ends of which are connected to arms 78, 78 carried by a rock shaft 79 journaled in frame 10 and provided at one end with a controlling lever 80 having an indent 81 adapted to engage a segment 82 carried by frame 10 or the seat member (shown in dotted lines in Fig. 1) mounted upon frame 10.

The compound jack shaft, composed of the tubular shaft 54 and the inner shaft 55, projects at its opposite ends a considerable distance beyond frame 10, and in order to stiffen this shaft I journal upon the outer ends of the tubular shaft 54 a bearing block 83 to which is pivotally connected one end of a distance rod 84, the rear end of which is pivotally connected to the rear axle 12. I also mount a similar bearing block 85 on the outer end of the shaft 55 and this bearing block is connected with the rear axle by a distance rod 86, said distance rod, however, journaled upon the rock shaft 24 and permitting a transverse movement of the jack shaft by means of the controlling lever 80.

Secured to the outer end of shaft 55 is a sprocket wheel 87 like sprocket wheel 57, and connected by a sprocket chain 88 with the sprocket wheel 19 to the traction wheel 17. Sprocket wheel 57 is connected by a sprocket chain 89 with the sprocket wheel 18 of the traction wheel 16.

In order to provide a cheap yet efficient brake for the structure I suspend beneath the low speed steps 52 and 68 of the friction wheels 50 and 66 respectively a brake band 90, the opposite ends of which are secured to cross bars forming part of the frame 10. For convenience in adjustment, etc., I prefer to provide the rear end of each band with a threaded stem 91 passing through the bracket 92 and held in place by nuts 93, so that the rear of the band may be properly adjusted in relation to the normal position of wheels 50 and 66.

For an emergency brake I mount beneath the fly wheel 45 a brake strap 95, the forward end of which is connected to a pivoted arm 96 extending from the rock shaft 24.

In order to produce a reverse train for the mechanism described, an idler pulley may be arranged to be thrown in the crotch between the friction wheels of the forward driving train, but an ordinary friction idler would not be satisfactory for such a purpose, for it is a well-known fact that if a paper idler were provided its coaction with one or the other of the small paper pulleys on the engine shaft would be far from satisfactory and the wheels would probably quickly wear into each other. On the other hand, if a metallic idler is provided its coaction with the other of the metal wheels 50 or 66 would not be satisfactory metal not giving satisfactory frictional driving contact on the same metal. In order to overcome this difficulty therefore, I have provided a stepped idler comprising a paper step 100 adapted to coact with the low speed step 52 of pulley 50, and a metal step 101 adapted to coact with the paper pulley 22. Similarly at the other side of the engine I provide a stepped idler having a paper step 102 adapted to coact with the low speed step 68 of pulley 66 and a metal step 103 adapted to coact with the paper pulley 23. Each stepped idler pulley is journaled upon a stud 104 carried in the ends of a pair of arms 105 carried by a sleeve 106 journaled on a pin 107 carried by the same bracket 108 which carries the outboard bearing 47 and pivoted upon the outer ends of pin 104 are links 109 which extend forward and are connected at their forward ends to arms 110 secured to a sleeve 111 journaled upon the rock shaft 24 and provided with a foot lever 112.

The operation is as follows: The engine is caused to operate in the direction indicated by the arrows in the several figures, and under normal conditions, with lever 80 turned back to the position shown by the line X in Fig. 1, there is no frictional engagement between the pulleys of the engine shaft and the pulleys of the compound jack shaft. If low speed is desired, the operator will press upon the foot lever 37 and this will rock the shaft 34 forward so as to draw forward on links 30 and swing the bell crank levers 28 and 29 in opposite directions from the position shown in Fig. 2, so as to pull the wheels 24 and 25 from the positions shown in Fig. 5 to the position Y in Fig. 1 will draw the jack shaft toward the engine shaft and bring the low speed steps 52 and 68 into frictional engagement ment with the pulleys 24 and 25, respectively, as shown in Fig. 6. The pulleys 24 and 25 are so proportioned with relation to their coacting steps 52 and 68 respectively, that said steps will come into engagement with said pulleys before the high speed steps 51 and 67 can engage pulleys 22 and 23 respectively, as clearly shown in Fig. 6. In practice the proportion between pulleys 22 and 24 differs from the proportion between steps 51 and 52 by an amount substantially equal to the expected wear of pulley 24, so that even though it may wear to its smallest diameter it will still prevent engagement between pulley 22 and step 51 so long as the pulley 24 is extended in the position shown in Fig. 6.

With the parts in driving engagement, as shown in Fig. 6, there will be a forward movement of the carriage and the speed can be regulated to some slight extent by a slight adjustment of the controlling lever 80 so as to increase or diminish to some extent the frictional engagement between the pulleys. The principal speed variation, however, will be accomplished, as is now quite common in the art, by a proper manipulation of the throttle valve and spark timer of the engine 20 where said engine is of any internal combustion type, as is probably the most desirable.

When a higher speed is desired, the operator has merely to depress lever 36 whereupon, without stopping the parts, pulleys 24 and 25 are nested into their corresponding pulleys 22 and 23 and the operator, by a slight movement of lever 80 to the position shown in full lines in Fig. 1, may bring the high speed steps 51 and 67 into frictional engagement with the pulleys 21 and 23 respectively.

When a stop is desired lever 80 will be thrown to the position Z, in Fig. 1. This movement of the controlling lever withdraws the jack shaft away from the engine shaft so as to separate the driving train and throws the low speed steps 52 and 68 of pulleys 50 and 66 respectively down into the brake straps 90 with as much or as little force as may be desired.

If for any reason a sudden stop is desired, the frictional engagement of the driving train will be maintained and the operator, by pressing upon foot lever 98 will bring the brake strap 95 into engagement with the fly wheel 45.

In the forward driving of the machine at either speed it will be noticed that, while the engine shaft is a single shaft and the friction wheels carried thereby rotate together at the two sides of the machine, yet the jack shaft is a composite shaft comprising the main shaft 55 and the tubular shaft 54, and that these two parts are connected respectively to the traction wheels 17 and 16 so that, in turning corners the difference in travel of the traction wheels is compensated by greater or less slippage in the frictional driving train of that wheel.

Under all conditions there is more or less slippage in a frictional driving train, and the slightly greater slippage due to turning of corners is practically a negligible quantity, so far as wear is concerned, and by actual practice has been found to be entirely satisfactory so far as the corner turning qualities of the machine are concerned.

In order to reverse, the operator has merely to throw lever 80 to the point X in Fig. 1 without regard to whether pulleys 24 and 25 are nested within or lying outside of their respective pulleys 22 and 23, and then to press upon foot lever 42, whereupon the stepped reversing idlers 100—101 and 102—103 are brought into frictional engagement with the driving train, as already described, there being a metal step of the idler in engagement with the paper member of the driving train and the paper step of the idler in engagement with the metal member of the driving train, so as to insure satisfactory frictional driving conditions and a reversal of movement of the traction wheels.

By nesting the friction wheels on the engine shaft I am able to get comparatively wide friction wheels within minimum space and by the movement of the one member of the train. Of course this movable member might be shifted in the opposite direction and thus avoid the nesting of that member within another member of the train but such an arrangement would require greater width of frame work and correspondingly increased overhang of the engine shaft, which would be undesirable.

I claim as my invention:

1. A driving train comprising two shafts, a pair of driving elements on the first of said shafts one larger than the other, a pair of corresponding driving elements on the second shaft one larger than the other, and means for shifting one of the driving elements of the second shaft into and out of coöperative alinement with its corresponding element of the first shaft, the proportion between the several elements being such that, when said shiftable element is in coöperative alinement and driving engagement with its coöperating element, the other pair of elements cannot be brought into driving engagement though in coöperative alinement.

2. A driving train comprising two substantially parallel shafts one transversely movable relative to the other, a pair of driving elements on the first of said shafts one larger than the other, a pair of corresponding driving elements on the second of said shafts one larger than the other, and means for shifting one of the driving elements of the second shaft into and out of coöperative alinement with its corresponding element of the first shaft, the proportion between the several elements being such that, when said shiftable element is in coöperative alinement and driving engagement with its coöperative element, the other pair of elements cannot be brought into driving engagement though in coöperative alinement.

3. In a motor vehicle, a driving train comprising a pair of shafts, two friction wheels of different sizes on the first of said shafts, two coöperative friction wheels on the second of said shafts, means for shifting one of said wheels of the second shaft axially into and out of coöperative alinement with the corresponding wheel of the first shaft, the proportions between the wheels being such that, when said shiftable wheel is in coöperative alinement and driving engagement with its coöperating wheel, there can be no driving engagement between the other pair of wheels though in coöperative alinement.

4. A driving train comprising a pair of substantially parallel shafts, one transversely movable toward the other, two friction wheels of different sizes on the first of said shafts, two coöperative friction wheels on the second of said shafts, means for shifting one of said wheels of the second shaft axially into and out of coöperative alinement with the corresponding wheel of the first shaft, the proportions between the wheels being such that, when said shiftable wheel is in coöperative alinement and driving engagement with its coöperating wheel, there can be no driving engagement between the other pair of wheels though in coöperative alinement.

5. A driving train comprising a pair of friction wheels of different materials, a reversing idler adapted to form a driving connection between said friction wheels, said reversing idler comprising a pair of coaxial portions each of a material corresponding to the material of one of the first mentioned friction wheels, and means for throwing said idler into and out of frictional engagement with said friction wheels, the materials of the portions of the idler being reversed relative to the materials of the friction wheels.

6. A driving train comprising a friction wheel having a metallic face, a friction wheel having a non-metallic face, and an intermediate friction wheel having coaxial metallic and non-metallic friction faces, the non-metallic friction face of the idler engaging the metallic friction faced wheel and the metallic friction face of the idler engaging the non-metallic friction faced wheel.

7. A driving train comprising a pair of shafts, a stepped metallic friction wheel on one of said shafts, a pair of coöperating non-metallic friction wheels on the other shaft, and means for shifting one of said non-metallic wheels axially into and out of coöperative alinement with one of the steps of the metallic friction wheel, the proportions between the several wheels being such that, when the shiftable wheel is in coöperative alinement and driving engagement with its coöperating wheel, the other wheels cannot be brought into driving engagement although in coöperative alinement.

8. A driving train comprising a pair of substantially parallel shafts, one movable transversely relative to the other, a stepped metallic friction wheel on one of said shafts, a pair of coöperating non-metallic friction wheels on the other shaft, and means for shifting one of said non-metallic wheels axially into and out of coöperative alinement with one of the steps of the metallic friction wheel, the proportions between the several wheels being such that, when the shiftable wheel is in coöperative alinement and driving engagement with its coöperating wheel the other wheels cannot be brought into driving engagement although in coöperative alinement.

9. A driving train comprising a pair of shafts, a stepped metallic friction wheel on one of said shafts, a pair of coöperating non-metallic friction wheels on the other shaft, and means for shifting one of said non-metallic wheels axially into and out of coöperative alinement with one of the steps of the metallic friction wheel and correspondingly out of and into the interior of the other non-metallic wheel, the proportions between the several wheels being such that, when the shiftable wheel is in coöperative alinement and driving engagement with its coöperating wheel the other wheels cannot be brought into driving engagement although in coöperative alinement.

10. A driving train comprising a pair of substantially parallel shafts, one movable transversely relative to the other, a stepped metallic friction wheel on one of said shafts, a pair of coöperating non-metallic friction wheels on the other shaft, and means for shifting one of said non-metallic wheels axially into and out of coöperative alinement with one of the steps of the metallic friction wheel and correspondingly out of and into the interior of the other non-metallic wheel, the proportions between the several wheels being such that, when the shiftable wheel is in coöperative alinement and driving engagement with its coöperating wheel, the other wheels cannot be brought into driving engagement although in coöperative alinement.

11. In a motor vehicle, a power shaft, a pair of friction wheels carried thereby, a substantially parallel transversely movable jack-shaft, a pair of friction wheels carried by the jack-shaft and adapted to simultaneously engage the pair of friction wheels of the power shaft and one of said friction wheels of the jack-shaft being independently journaled thereon, a pair of independent traction wheels, and a driving connection between each traction wheel and one of the friction wheels of the jack-shaft.

12. In a motor vehicle, a pair of independent traction wheels, a jack-shaft, a pair of stepped friction wheels carried thereby, one of said stepped friction wheels being independently journaled on the jack-shaft, a driving connection between each traction wheel and one of the stepped friction wheels of the jack-shaft, a power shaft, two pairs of friction wheels rotatably secured to said power shaft and one wheel of each said last mentioned pairs axially shiftable into and out of coöperative alinement with its step of the corresponding jack-shaft friction wheel, the relative sizes of the coöperative friction wheels being such that, when the shiftable wheel is in coöperative alinement and driving engagement with the step of its coöperating jack-shaft-wheel, the other power-shaft-wheel cannot drivingly engage its step of the corresponding jack-shaft-wheel, means for simultaneously and correspondingly shifting the shiftable wheels of the power shaft, and means for transversely shifting the jack shaft.

13. In a motor vehicle, a pair of independent traction wheels, a jack-shaft, a pair of stepped friction wheels carried thereby, one of said stepped friction wheels being independently journaled on the jack shaft, a driving connection between each traction wheel and one of the stepped friction wheels of the jack-shaft, a power shaft, two pairs of friction wheels rotatably secured to said power shaft and one wheel of each said last-mentioned pairs axially shiftable into and out of coöperative alinement with its step of the corresponding jack shaft friction wheel and out of and into the interior of its companion power-shaft-wheel, the relative sizes of the coöperative friction wheels being such that, when the shiftable wheel is in coöperative alinement and driving engagement with the step of its coöperating jack-shaft-wheel, the other power-shaft-wheel cannot drivingly engage its step of the corresponding jack-shaft-wheel, means for simultaneously and correspondingly shifting the shiftable wheels of the power shaft, and means for transversely shifting the jack shaft.

14. A driving train comprising two shafts, a pair of driving elements on the first of said shafts one larger than the other, a pair of corresponding driving elements on the second shaft one smaller than the other and nested in said other, and means for shifting said smaller element out of and into nestment with the larger element and correspondingly into and out of coöperative alinement with its corresponding element of the first shaft, the proportion between the several elements being such that, when said shiftable element is in coöperative alinement and driving engagement with its coöperative element, the other pair of elements cannot be brought into driving engagement though in coöperative alinement.

15. A driving train comprising two substantially parallel shafts one transversely movable relative to the other, a pair of driving elements on the first shaft one larger than the other, a pair of corresponding driving elements on the second shaft one smaller than the other and nested in said other, and means for shifting said smaller element out of and into nestment with the larger element and correspondingly into and out of coöperative alinement with its corresponding element of the first shaft, the proportion between the several elements being such that, when said shiftable element is in coöperative alinement and driving engagement with its coöperative element, the other pair of elements cannot be brought into driving engagement though in coöperative alinement.

16. A driving train comprising a pair of shafts, two friction wheels of different size on the first of said shafts, two coöperative friction wheels on the second of said shafts one smaller than the other and nestable therein, and means for shifting said smaller wheel out of and into nestment into and out of coöperative alinement with the corresponding wheel of the first shaft, the proportions between the wheels being such that, when said shiftable wheel is in coöperative alinement and driving engagement with its coöperating wheel, there can be no driving engagement between the other pair of wheels though in coöperative alinement.

17. A driving train comprising a pair of substantially parallel shafts, one transversely movable toward the other, two friction wheels of different size on the first of said shafts, two coöperative friction wheels on the second of said shafts one smaller than the other and nestable therein, and means for shifting said smaller wheel out of and into nestment into and out of coöperative alinement with the corresponding wheel of the first shaft, the proportions between the wheels being such that, when said shiftable wheel is in coöperative alinement and driving engagement with its coöperating wheel, there can be no driving engagement between the other pair of wheels though in coöperative alinement.

18. In a motor vehicle, a pair of independent traction wheels, a jack-shaft carrying a pair of stepped metallic-faced friction wheels one of said stepped-friction wheels being independently journaled on the jack-shaft, a driving connection between each traction wheel and one of the stepped-friction wheels of the jack-shaft, a power shaft, two pairs of non-metallic faced friction wheels rotatably secured to said power shaft and one wheel of each of said last mentioned pairs axially shiftable into and out of coöperative alinement with its step of the corresponding jack-shaft friction wheel, the relative sizes of the coöperative friction wheels being such that, when the shiftable wheel is in coöperative alinement and driving engagement with the step of its coöperative jack-shaft wheel, the other power-shaft wheel cannot be in driving engagement with its step of the corresponding jack-shaft wheel, means for simultaneously and correspondingly shifting the shiftable wheels of the power-shaft, and means for transversely shifting the jack-shaft.

19. In a motor vehicle, a pair of independent traction wheels, a jack-shaft, a pair of stepped metallic-faced friction wheels carried by the jack-shaft and one of said stepped-friction wheels being independently journaled on the jack-shaft, a driving connection between each traction wheel and one of the stepped-friction wheels of the jack-shaft, a power shaft, two pairs of non-metallic faced friction wheels rotatably secured to said power shaft and one wheel of each of said last mentioned pairs axially shiftable into and out of coöperative alinement with its step of the corresponding jack-shaft friction wheel and out of and into the interior of its companion power-shaft-wheel, the relative sizes of the coöperative friction wheels being such that, when the shiftable wheel is in coöperative alinement and driving engagement with the step of its coöperative jack-shaft wheel, the other power-shaft wheel cannot be in driving engagement with its step of the corresponding jack-shaft wheel, means for simultaneously and correspondingly shifting the shiftable wheels of the power-shaft, and means for transversely shifting the jack-shaft.

20. In a motor vehicle, a pair of independent traction wheels, a jack-shaft, a pair of stepped friction wheels carried thereby, one of said stepped friction wheels being independently journaled on the jack-shaft, a driving connection between each traction wheel and one of the steeped friction wheels of the jack-shaft, a power shaft, two pairs of friction wheels rotatably secured to said power shaft and one wheel of each of said last mentioned pair axially shiftable into and out of coöperative alinement with its step of the corresponding jack-shaft wheel, the relative sizes of the coöperative friction wheels being such that, when the shiftable wheel is in coöperative alinement and driving engagement with the step of its coöperating jack-wheel, the other power-shaft-wheel cannot drivingly engage its step of the corresponding jack-shaft-wheel, means for simultaneously and correspondingly shifting the shiftable wheels of the power shaft, means for transversely shifting the jack-shaft, a pair of reversing idlers one for each driving train, each of said idlers having a metallic friction face adapted to engage one of the non-metallic power-shaft wheels, and also having a non-metallic-face adapted to engage the metallic-face of a jack-shaft wheel, and means for throwing said reversing idlers into and out of operative position.

21. In a motor vehicle, a pair of independent traction wheels, a jack-shaft, a pair of stepped friction wheels carried thereby, one of said stepped friction wheels being independently journaled on the jack-shaft, a driving connection between each traction wheel and one of the stepped friction wheels of the jack-shaft, a power shaft, two pairs of friction wheels rotatably secured to said power shaft and one wheel of each of said last-mentioned pairs axially shiftable into and out of coöperative alinement with its step of the corresponding jack-shaft friction wheel and out of and into the interior of its companion power-shaft-wheel, the relative sizes of the coöperative friction wheels being such that, when the shiftable wheel is in coöperative alinement and driving engagement with the step of its coöperating jack-shaft-wheel, the other power-shaft-wheel cannot drivingly engage its step of the corresponding jack-shaft-wheel, means for simultaneously and correspondingly shifting the shiftable wheels of the power shaft, means for transversely shifting the jack-shaft, a pair of reversing idlers one for each driving train, each of said idlers having a metallic friction face adapted to engage one of the non-metallic power-shaft-wheels, and also having a non-metallic-face adapted to engage the metallic-face of a jack-shaft wheel, and means for throwing said reversing idlers into and out of operative position.

22. A driving train comprising two shafts, a pair of driving elements on the first of said shafts one larger than the other, a pair of corresponding driving elements on the second shaft one smaller than the other and nested in said other, and means for shifting said smaller element out of and into nestment with the larger element and correspondingly into and out of coöperative alinement with its corresponding element of the first shafts, the proportion between the several elements being such that, when said shiftable element is in coöperative alinement and driving engagement with its coöperative element, the other pair of elements cannot be brought into driving engagement though in coöperative alinement, a pair of reversing idlers one for each driving train, each of said idlers having a metallic friction face adapted to engage one of the non-metallic power-shaft wheels, and also having a non-metallic-face adapted to engage the metallic-face of a jack-shaft wheel, and means for throwing said reversing idlers into and out of operative position.

23. A driving train comprising two substantially parallel shafts one transversely movable relative to the other, a pair of driving elements on the first shaft one larger than the other, a pair of corresponding driving elements on the second shaft one smaller than the other and nested in said other, and means for shifting said smaller element out of and into nestment with the larger element and correspondingly into and out of coöperative alinement with its corresponding element of the first shaft, the proportion between the several elements being such that, when said shiftable element is in coöperative alinement and driving engagement with its coöperative element, the other pair of elements cannot be brought into driving engagement though in coöperative alinement, a pair of reversing idlers one for each driving train, each of said idlers having a metallic friction face adapted to engage one of the non-metallic power-shaft wheels, and also having a non-metallic-face adapted to engage the metallic-face of a jack-shaft wheel, and means for throwing said reversing idlers into and out of operative position.

24. A driving train comprising a pair of shafts, two friction wheels of different size on the first of said shafts, two coöperative friction wheels on the second of said shafts one smaller than the other and nestable therein, means for shifting said smaller wheel out of and into nestment into and out of coöperative alinement with the corresponding wheel of the first shaft, the proportions between the wheels being such that, when said shiftable wheel is in coöperative alinement and driving engagement with its coöperating wheel, there can be no driving engagement between the other pair of wheels though in coöperative alinement, a pair of reversing idlers one for each driving train, each of said idlers having a metallic friction face adapted to engage one of the non-metallic power-shaft wheels, and also having a non-metallic-face adapted to engage the metallic-face of a jack-shaft wheel, and means for throwing said reversing idlers into and out of operative position.

25. A driving train comprising a pair of substantially parallel shafts, one transversely movable toward the other, two friction wheels of different size on the first of said shafts, two coöperative friction wheels on the second of said shafts one smaller than the other and nestable therein, means for shifting said smaller wheel out of and into nestment into and out of coöperative alinement with the corresponding wheel of the first shaft, the proportions between the wheels being such that, when said shiftable wheel is in coöperative alinement and driving engagement with its coöperating wheel, there can be no driving engagement between the other pair of wheels though in coöperative alinement, a pair of reversing idlers one for each driving train, each of said idlers having a metallic friction face adapted to engage one of the non-metallic power-shaft wheels, and also having a non-metallic-face adapted to engage the metallic-face of a jack-shaft wheel, and means for throwing said reversing idlers into and out of operative position.

26. A driving train comprising a pair of shafts, a driving element carried by one of said shafts, a pair of driving elements carried by the other of said shafts, one being fixedly in coöperating alinement with the driving element of the first shaft and the other being axially shiftable into and out of operative alinement with said element of the first shaft.

In witness whereof, I have hereunto set my hand and seal at Indianapolis, Indiana, this fourteenth day of October, A. D. one thousand nine hundred and seven.

MILTON O. REEVES. [L. S.]

Witnesses:
ARTHUR M. HOOD,
THOMAS W. MCMEANS.